(12) United States Patent
Criswell et al.

(10) Patent No.: US 9,665,966 B2
(45) Date of Patent: May 30, 2017

(54) SIMULATION OBJECT CONNECTIONS

(75) Inventors: Brice Criswell, Novato, CA (US);
Karin Cooper, San Anselmo, CA (US);
Don Hatch, Santa Cruz, CA (US);
James Robert Tooley, Novato, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 1657 days.

(21) Appl. No.: 11/566,081

(22) Filed: Dec. 1, 2006

(65) Prior Publication Data

US 2008/0133189 A1    Jun. 5, 2008

(51) Int. Cl.
*G06T 13/20* (2011.01)

(52) U.S. Cl.
CPC .................................. *G06T 13/20* (2013.01)

(58) Field of Classification Search
USPC ............... 345/418–428, 440–443, 467–475, 345/581–689
See application file for complete search history.

(56) References Cited

U.S. PATENT DOCUMENTS

| | | | | |
|---|---|---|---|---|
| 6,441,814 | B1 * | 8/2002 | Mine et al. | 345/419 |
| 7,403,202 | B1 * | 7/2008 | Nash | 345/474 |
| 7,468,730 | B2 * | 12/2008 | Petrovic et al. | 345/473 |
| 2007/0247465 | A1 * | 10/2007 | Hadap | 345/473 |

OTHER PUBLICATIONS

Choe, B. et al., "Simulating complex hair with robust collision handling", Proceedings of the 2005 ACM SIGGRAPH/Eurographics symposium on Computer animation, Jul. 29-31, 2005 Los Angeles, California.*
"Cloth/Maya Unlimited (version 6)" User's Manual, Alias Systems, 2004.*
Chang JT, Jin J, Yu Y. A practical model for hair mutual interactions. In Proceedings of the 2002 ACM SIGGRAPH/Eurographics symposium on Computer animation Jul. 21, 2002 (pp. 73-80). ACM.*
Bridson, R. et al. "Simulation of Clothing with Folds and Wrinkles", Proceedings of the 2003 SIGGRAPH/Eurographics Symposium on Computer Animation, Jul. 26, 2003, Eurographics Association Aire-la-Ville, Switzerland, Switzerland, pp. 28-36.

* cited by examiner

*Primary Examiner* — Ke Xiao
*Assistant Examiner* — Donna J Ricks
(74) *Attorney, Agent, or Firm* — Kilpatrick Townsend & Stockton LLP (57) ABSTRACT

Representing a connection between objects in a simulation includes identifying, on a source object to be used in a simulation process, a source point that is available for creating a connection to another object. On a target object, a target point is identified for use in creating the connection. At least one of the source object and the target object is a rigid object. A spring element having respective ends at the source point and the target point is created, and at least one property thereof is set. A system includes an animation module, and a simulation module that performs a simulation process involving creating, and setting a property of, a spring element having respective ends at a source point on the source object and a target point on the target object.

22 Claims, 8 Drawing Sheets

SIMULATION OBJECT CONNECTIONS

TECHNICAL FIELD

This document relates to simulation using a computer system.

BACKGROUND

In some areas of computer graphics processing a simulation is performed involving one or more objects. The simulation can be performed in an effort to generate a realistic behavior of an object. For example, interaction between objects can be simulated to make them behave as if the laws of nature were applied.

One example of a force that can be represented in a simulation process is static friction, or "stiction". Generally, friction is the resistive force that can occur between objects depending on their surface characteristics. Static friction is the force that, while an object is at rest, opposes the object from moving out of its current position. This stands in contrast to another form of friction, sometimes referred to as dynamic friction, which is the force acting on the object while in motion (and that is generally opposed to the direction of motion).

SUMMARY

In a first aspect, a computer-implemented method for representing a connection between objects in a simulation includes identifying, on a source object to be used in a simulation process, a source point that is available for creating a connection to another object. The method includes identifying, on a target object, a target point for use in creating the connection. At least one of the source object and the target object is a rigid object. The method includes creating a spring element having respective ends at the source point and the target point, and setting at least one property of the spring element.

Implementations can include any, all or none of the following features. One of the source object and the target object can be the rigid object and another one of the source object and the target object can be a deformable object. One of the source object and the target object can be a non-dynamic object whose position is defined to not be affected by the simulation process. The method can further include determining whether at least one criterion for spring element creation is met. The spring element can be created in response to the determination. The criterion for spring element creation can be a criterion selected from the group consisting of: the source object and the target object being at less than a predefined distance, no other spring element already having an end at either of the source point and the target point, a map parameter permits the spring element creation, and each of the source point and the target point having less than a predefined spring density. The target point can be identified based on being a closest point on the target object to the sources point. The simulation process can be performed in cycles wherein any existing spring elements can be reevaluated in each cycle. The method can further include selecting, during a next cycle, a shorter length of: (i) a rest length of the spring element and (ii) a current length of the spring element, and assigning the shorter length as a new length of the spring element. The method can further include detaching the spring element if its current length is at least equal to a predefined length. The method can further include receiving, before creating the spring element, a user-entered identification of at least one of several points on either of the source object and the target object to be eligible for having the spring element created. The method can further include presenting at least one of the source and target objects in a graphical user interface before creating the spring element. The user can enter the identification by marking the at least one point on the presented object in the graphical user interface. The method can further include receiving, before creating the spring element, a user-entered definition of the at least one property. The property can be a property selected from the group consisting of: a threshold distance for creating the spring element, a threshold distance for detaching the spring element, a threshold density of spring elements, a spring stiffness, a spring damping, and a spring rest length. The spring element can be defined so that an attractive force between the source object and the target object is simulated. The spring element can be defined so that a repulsive force between the source object and the target object is simulated. At least one of the source object and the target object can be included in an articulated chain of objects wherein a torque function is defined between adjacent objects in the articulated chain.

In a second aspect, a system includes an animation module that performs an animation involving at least a source object and a target object. At least one of the source and target objects is a rigid object. The system includes a simulation module that performs a simulation process that involves creating, and setting a property of, a spring element having respective ends at a source point on the source object and a target point on the target object.

Implementations can include any, all or none of the following features. The simulation module can include a dynamics simulation library that includes data abstractions for configuring the simulation process. The dynamics simulation library can be configured to connect to a physics solver module that applies at least one force between the source and target objects. The dynamics simulation library can include a library of simulation classes for the simulation process. The dynamics simulation library can include objects that communicate with a physics solver module that applies at least one force between the source and target objects.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
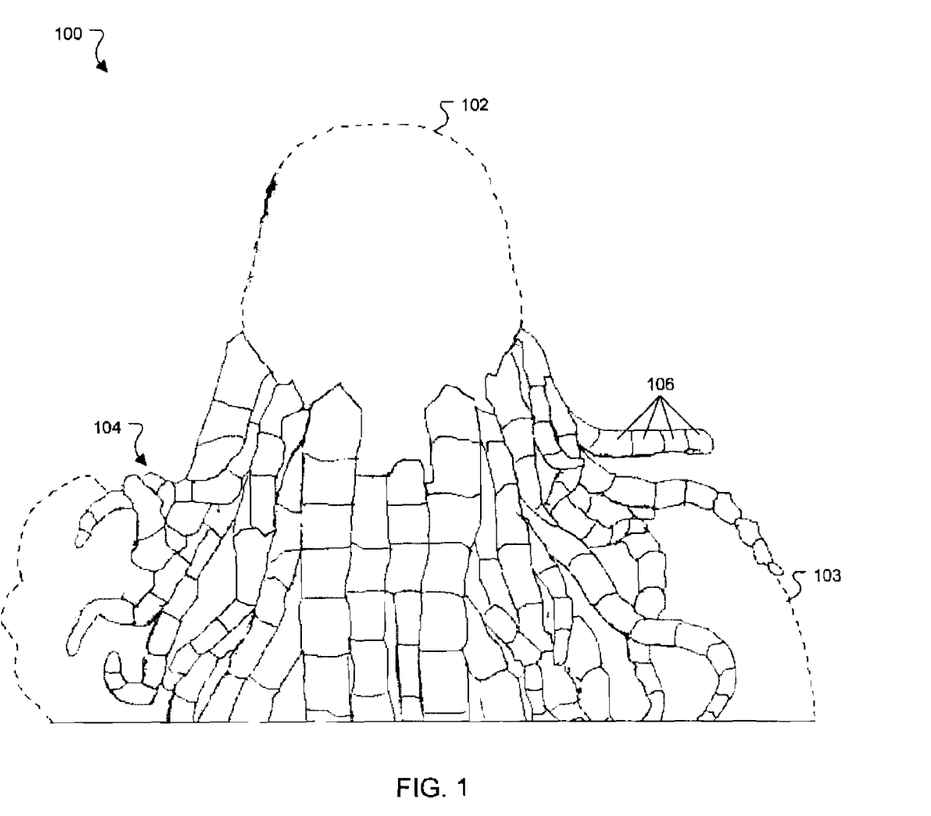
FIG. 1 is an example sketch illustrating a rigid simulation rig of a computer graphics character.

FIG. 1 is an example sketch illustrating a rigid simulation rig of a computer graphics character 100. In particular, the character 100 illustrated here is a portion of the Davy Jones character from the movie "Pirates of the Caribbean 2: Dead Man's Chest." The Davy Jones character 100 includes a head 102, a body 103 (only partially shown), and a beard 104 having several "tentacles" designed to look like the tentacles of an octopus. The head 102 and/or the body 103 may be animated to reflect the movement of the character, while the motion of the tentacles 104 can be simulated based on interaction between the tentacles 104 and the head 102 or the body 103. The animations and simulations can be performed in a computer-based process that involves linking rigid bodies to deformable objects for animating, simulating, or deforming rigid body character components. Advantageously, the process may allow the interaction of rigid objects and deformable objects to be simulated.

In some implementations, several rigid bodies and joints may be included for a character. In particular, the tentacles included on the beard 104 may include of a chain of rigid bodies 106, pair-wise attached to each other by articulated point joints that serve as a connection between the rigid bodies 106. One or more torque functions may be defined for the rigid bodies and point joints to manage their behavior.

The simulated movement of the beard 104 can be made to resemble some aspect of the interaction between physical objects. For example, a real tentacle may include several suction cups that can grab onto surfaces and later be released at any time. The tentacles in the beard 104 may mimic such a grab and release functionality to provide a realistic behavior for the character 100. Specifically, the simulation of the beard 104 may include dynamically attaching or detaching computer-based spring elements between the tentacles and another object. For example, the dynamic attaching or detaching of spring elements may occur because the character 100 moves a component, such as the head 102. Here, the tentacles can be perceived as more realistic if head movements are propagated throughout the beard 104. Thus, the spring elements can be attached or detached to perform the necessary modifications to the beard 104 as the head 102 moves. The spring elements used to animate the beard 104 may be created and destroyed using a combination of graphics modules, solver modules, controllers, targeting systems, dynamics engines, and library files, for example as will be described later.

Figure 2:
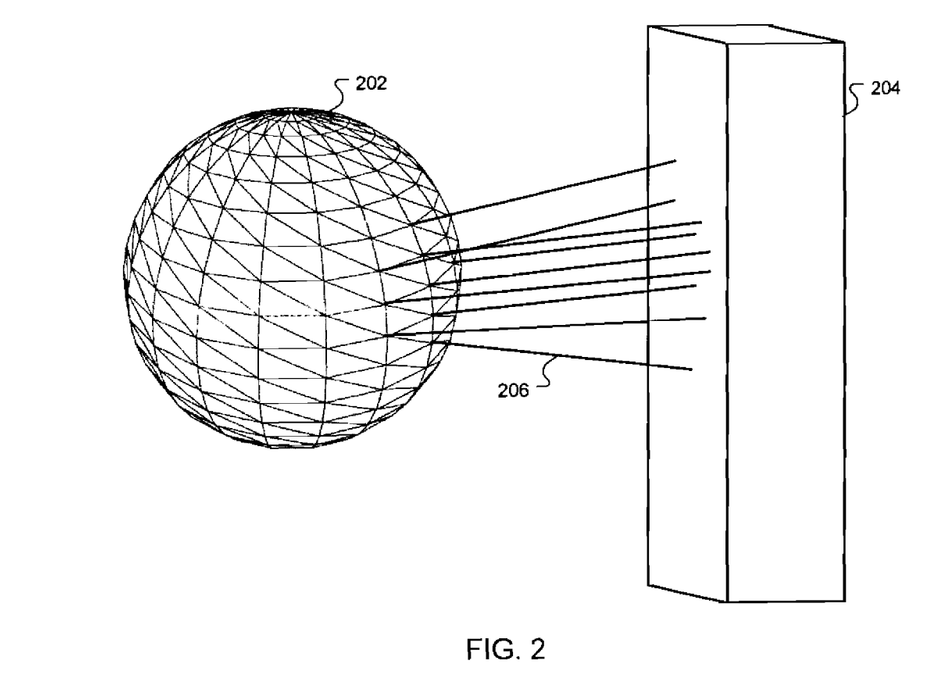
FIG. 2 illustrates an example of the creation of spring elements between a source object and a target object.

FIG. 2 illustrates an example of the creation of spring elements between a source object 202 and a target object 204. The spring elements may be defined to resemble static friction, or "stiction," that can appear between the objects involved. These objects can be tentacles that move across one another, or against the character 100, or other objects, to name a few examples. The stiction spring technology may provide the ability to represent a "sticky" connection between objects in a simulation. In some implementations, stiction spring technology may provide the ability to dampen the energy between objects.

In general, the system can be configured to create a stiction spring when a distance between the surfaces of two objects meets a predefined requirement. The threshold may be user definable and may change according to other rules in the system. Conversely, the stiction spring may be destroyed when the simulation or animated motion causes it to extend beyond a predefined maximum allowed length.

The stiction-spring interface may be implemented to work with a set of area maps on the involved objects, such as on the underside of the tentacles. The area maps may define regions where springs can be created under certain circumstances, as well as other regions where springs cannot be created. The area maps may be user defined according to the movement expected from the character, or other simulation expectation. The defined regions may include properties indicating distances at which springs may be created or destroyed, thus displaying the correct motion of the grab and release animation. For example, the defined regions may include properties such as length, source points, target points, tension, diameter, compression, extension, stiffness or other spring properties. Generally, the properties may be user defined for a character or rig. For example, the user may control the density of the springs created, as well as the strength of individual springs.

In general, objects used for simulation may be considered as being a source object 202 or a target object 204, or both. For example, the sphere in FIG. 2 is presently considered a source object while the cube is presently considered a target object. In some implementations, several source objects and target objects may be configured and grouped accordingly. For example, source objects 202 may be grouped into a "source group" while target objects 204 may be grouped into a "target group." The source group can include a set of simulation object identifiers that may have ownership of created springs. The target group can include a set of simulation nodes where source objects can be attached. Advantageously, the two group relationship may allow the system to set up a directed relationship from the source objects to the target objects.

Turning to the illustrated embodiment, the source object 202 (shown here as a sphere) includes at least one area map indicating where spring elements may be created and attached. Here, the springs shown in FIG. 2 generally originate from a point on the source object 202 and connect to the surface of the target object 204. For example, a spring 206 is presently created from a point on the source object 202, and attached to the surface of the target object 204. In one implementation, the source point on the source object is always a vertex, and the target point can be any point or location on the target object. Since the spring elements here originated from the source object 202, the source object may have the ownership of the springs. Thus, upon deletion of the source object 202, the spring elements may be removed. In some implementations, the spring element may default to attaching at the centers of mass of the source object 202 and the target object 204.

In operation, the source object 202 is selected for use in the simulation process. The source objects 202 may have one or more source points available for creating a connection to another object, as noted above. The target object may then be identified and target points or nodes may be selected for attaching springs. In some implementations, the target points may be identified based on being the closest point on the target object to the source point. One or more properties of the intended spring may be configured by a user to direct the spring during simulation. For example, the user may configure properties, such as a threshold distance for creating the spring, a threshold distance for detaching the spring, a threshold density of a source object's springs, spring stiffness, spring damping, and spring rest length, to name a few examples. The spring (e.g., spring element 206) may then be created, where its respective ends are attached at the source point and the target point.

In one example, source objects and target objects may be characterized as rigid bodies or deformable bodies. A rigid body may include bodies having the characteristic that particles in the rigid body may be fixed relative to the center of mass of the body and further may rotate about the center of mass. This may cause the distance between any two given points of the rigid body to remain constant in time regardless of external forces exerted on any portion of the object. For example, a rigid object can represent wood or metal. Conversely, a deformable body may be defined so that its particles can move relative to the center of mass of the body. This may cause the shape or volume of the deformable object to change while the object is acted upon by an external force. For example, a deformable object can represent cloth.

In some implementations, the source object may be a rigid body while the target object is a deformable body, or vice versa. In other implementations, the source object and the target object may both be rigid bodies. Regardless of the type of body, the spring elements may connect a source object to a target object. In some implementations, the source object 202, and the target object 204 can also be characterized as a non-dynamic object whose position is defined to not be affected by the simulation process. For example, the head 102 (FIG. 1) or the body 103 can be non-dynamic objects. Non-dynamic objects may be rigid or deformable bodies.

Spring elements may be defined in various ways. In particular, the springs may have one or more properties defining their behavior and characteristics. In some implementations, spring elements may be defined such that an attractive force between the source object and the target object is simulated. For example, a movie scene may require a tentacle (such as those shown in FIG. 1) to grab a target object, such as a glass bottle. Here, a spring can be created that defines a static friction between the tentacle and the bottle. In other implementations, spring elements may be defined so that a repulsive force between the source object and target object is simulated. For example, one or more of the springs 206 can be used to represent a repulsive force between the source object 202 and the target object 204, so that an energy of either of the objects relative to the other is dampened by the influence of the spring(s). In some implementations, the spring elements for an object may include several attractive forces, repulsive forces, torsion forces, or a combination of any or all of these forces. Other forces are also possible.

In operation, the spring element forces may be dynamically created and defined by simulation libraries. The simulation libraries may be software modules having databases and predefined operations. The predefined operations may be invoked automatically or by a system user. For example, when a user wishes to define a mapping area for a stiction spring, one or more simulation libraries may be used to define the area. Various libraries may be used to carry out animation and simulation tasks for a particular character.

Figure 3:
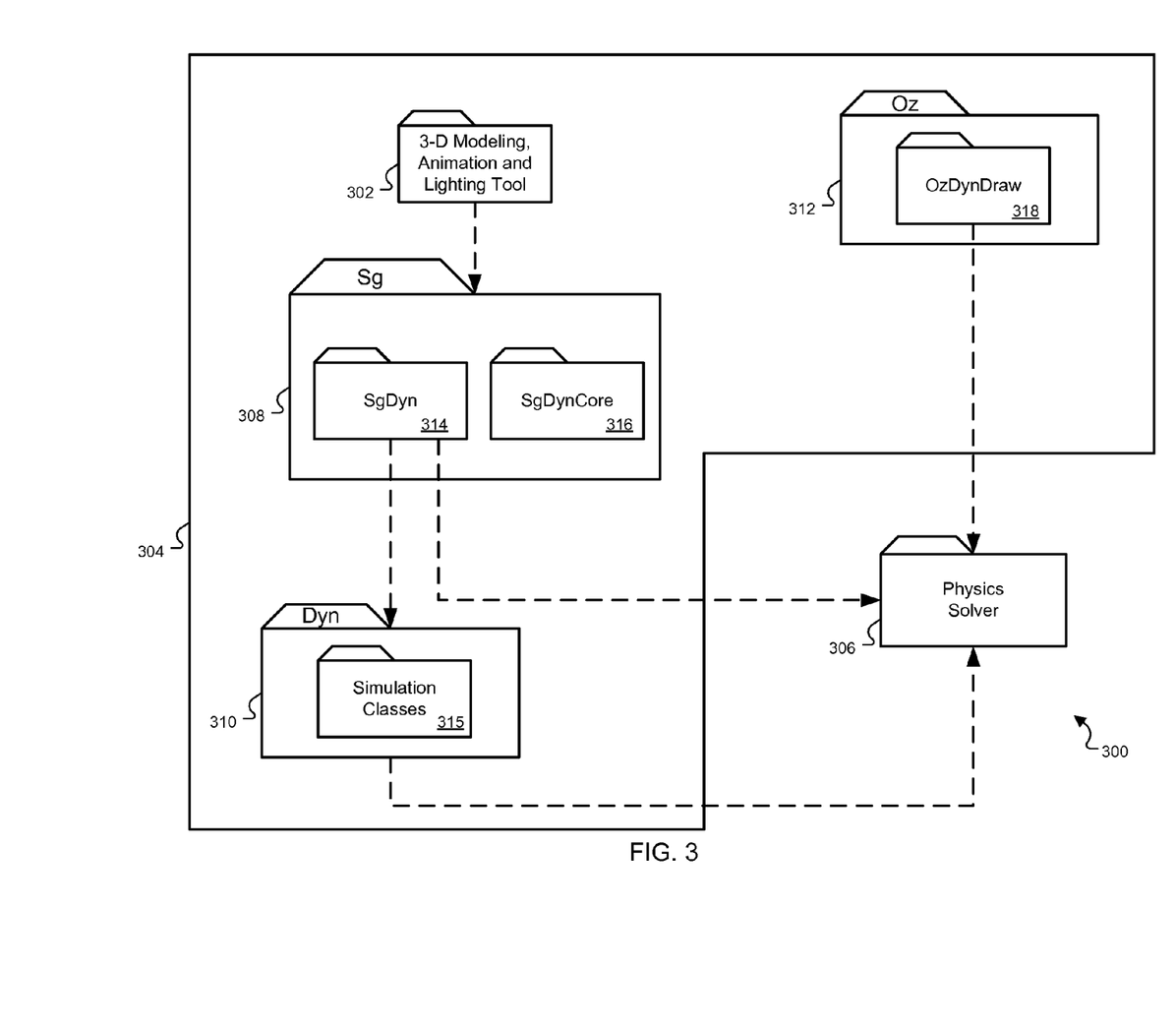
FIG. 3 illustrates the interaction between various libraries and software modules for animating the simulation rig of FIG. 1.

FIG. 3 illustrates interactions between various libraries and software modules for animating the simulation rig of FIG. 1. The libraries may store data for the software modules to use in a simulation process. For example, the libraries may store data such as character properties, spring element characteristics, and object functions, to name a few examples.

As shown, the system 300 includes an animation module 302, a simulation module 304, and a physics solver module 306. Briefly, the animation module 302 can be used to define an animation that the simulation module 304 thereafter uses in a simulation, the simulation being determined using the physics solver 306. The modules 302, 304, and 306 may invoke one or more simulation library in the system 300, for example. Specifically, the libraries may be invoked to define a source or target object, assign properties to defined objects, assign behavior to defined objects, or apply forces between objects.

The animation module 302 can include tools for creating and animating three dimensional character rigs. The animation module 302 may allow a user or artist to create the three dimensional character model, define stiction spring elements that can be created, define the animation parameters, and create the lighting characteristics in the animation, to name some examples. The user may perform the above operations in a graphics program, such as Zeno, the proprietary software package from Industrial Light & Magic. The Zeno program may allow the user to create, visualize and configure character behavior, as well as the stiction-spring interface. In some implementations, the animation module 302 may function as part of the simulation module 304, and vice versa.

In general, the animation module 302 may be used to define the animation, and based on this the simulation can then be performed. The simulation, in turn, can involve one or more of a source object, target object, or stiction spring element. The source or target objects may be rigid or deformable and may be animated using input from the user. As such, the animation module 302 may define the object and element characteristics accordingly. For example, the user may enter information to define one or more points on either of the source or target object to be eligible for having the friction spring element created. In some implementations, the points may be created within the user defined area maps, as discussed with reference to FIG. 1. In other implementations, the user may mark the map area points within a graphical user interface (GUI) before the spring element is created, for example by "painting" the area(s) in the GUI using a pointer device. For example, either the source object or target object may be loaded in the GUI for the user to define map area points.

The simulation module 304 may perform a simulation process that involves creating a spring element to have one or more properties, and later detaching or removing the spring element. For example, the simulation module 304 may assign a particular spring connection point on either or both of the source and target objects. Thus, the spring element may have its respective ends at a source point on the source object and a target point on the target object. As such, the simulation module 304 may be used to perform initial configuration and setup of one or more stiction spring elements.

The simulation module 304 may include various libraries for storing and retrieving simulation data. For example, one library may contain configuration data, while another contains scene information. The example libraries shown here include a scene geometry (SG) library 308, a simulation class library (Dyn) 310, and a display library (OZ) 312. Some, all or none of the above libraries can be used in simulation processing. For example, a user may choose to exclude one or more libraries if the functionality in the excluded libraries is unnecessary for a particular simulation.

The scene geometry library 308 may store scene graph data that may be retrieved by the animation module 302. The scene geometry library 308 includes a dynamics simulation library (SgDyn) 314 and a solver manager (SgDynCore) 316. Here, the dynamics simulation library 314 may define data abstractions used to configure simulations in the system 300. The dynamics simulation library 314 my also include, or have access to a library of simulation classes 315 for the simulation process. Further, the library 314 may provide a connection with the physics solver 306. For example, the dynamics simulation library 314 may be configured to connect to the physics solver module 306 where forces can be applied between source and target objects. In the event that the dynamics simulation library employs the physics solver module 306, the solver manager 316 can manage the state of the solver by initializing, deleting, and advancing the current state of the physics solver 306.

The display library 312 can include one or more image libraries capable of rendering images to a screen. For example, the display library 312 may include a nested library (OzDynDraw) 318 that contains objects used to draw the simulation objects to a screen. In some implementations, the display library 312 can be used to render stiction spring elements. In some implementations, data may be retrieved or stored for informational purposes instead of simulation purposes. In this example, the simulation library may not use the display library 312 since the data need not be displayed to the screen.

In operation, the simulation in system 300 may be initiated by a user that has set up predefined library information through the software modules. For example, the user may configure character data in the animation module 302 and store the data in one or more libraries before the simulation is performed. In general, the user can initiate the simulation process in the animation module 302. In some implementations, the simulation process may be initiated elsewhere in the system 300. Next, simulation data may be retrieved from the scene geometry library 308 or the simulation class library 310, concurrently or sequentially.

The data may be used as input into the physics solver 306. The physics solver may then use the information to simulate the movements and behavior of the simulated object(s). In one example, the physics solver 306 can create and destroy contact forces for stiction spring elements in the character 100. In some implementations, the physics solver 306 can include the PhysBAM solver available from Stanford University.

Figure 4A:
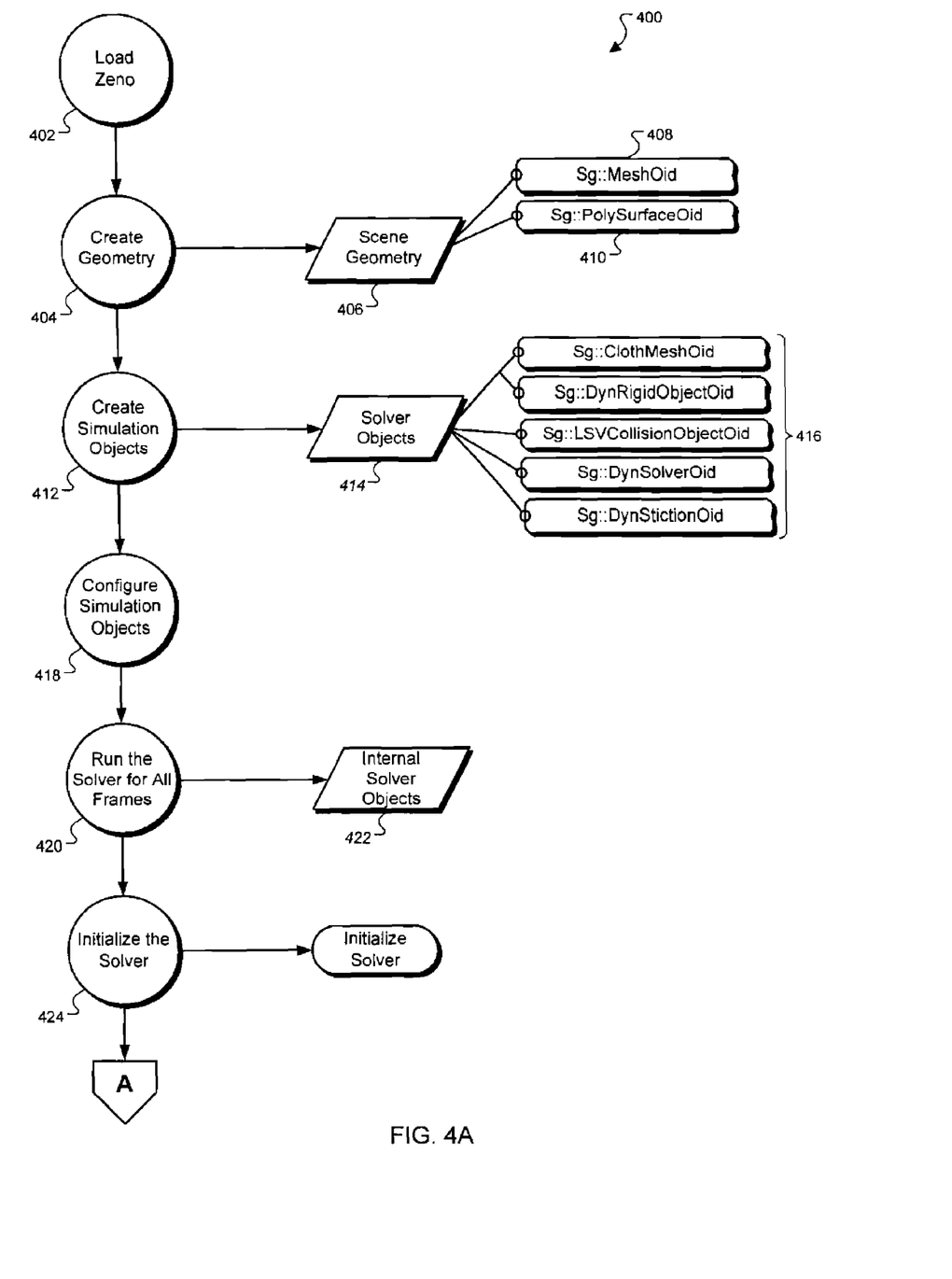
FIGS. 4A-B are flow charts of exemplary operations that can be performed to attach and detach contact forces in the simulation rig of FIG. 1.
Figure 4B:
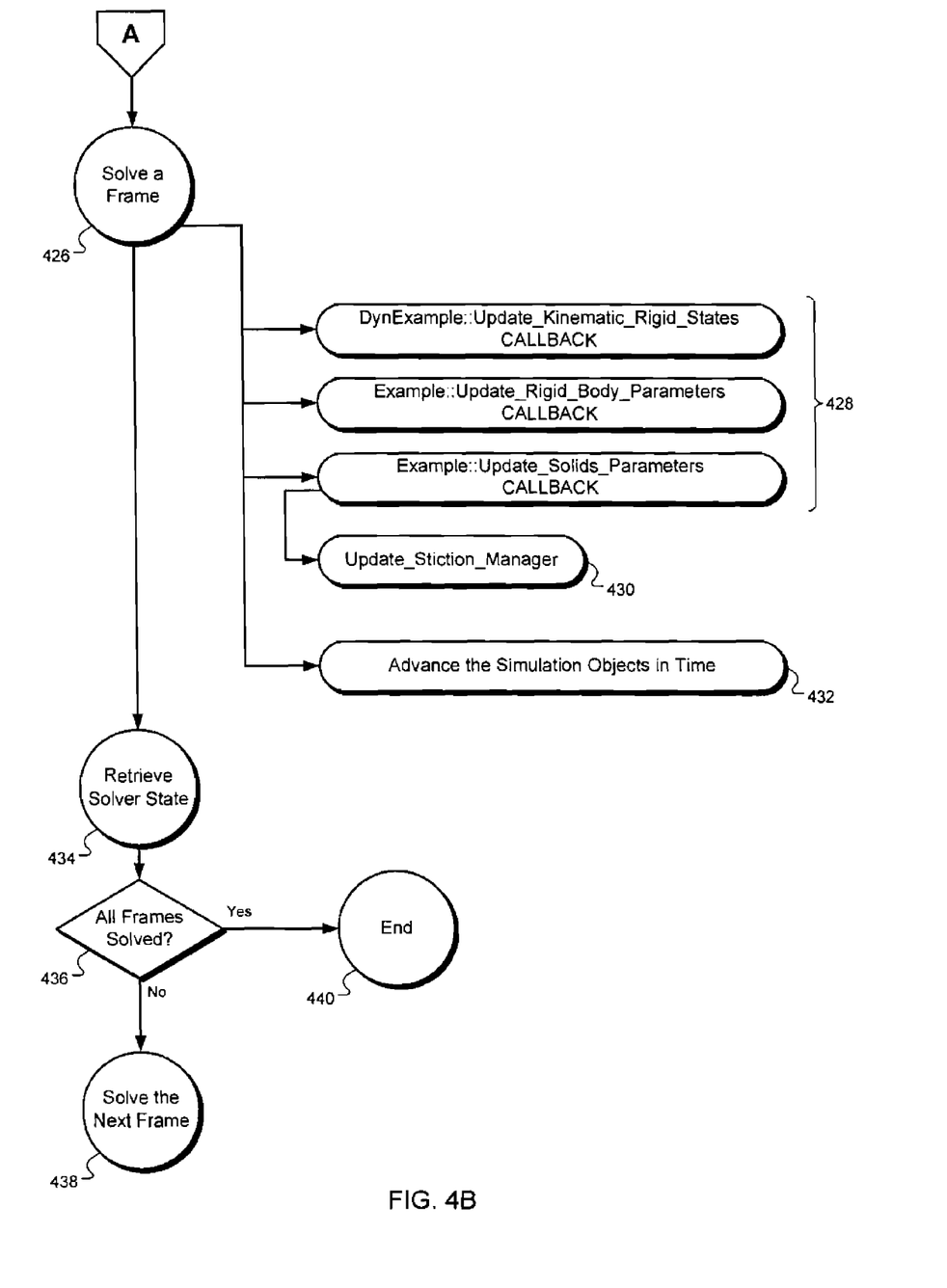

FIGS. 4A-B are flow charts of exemplary operations 400 that can be performed to facilitate a simulation process, for example to attach or detach contact forces in the simulation rig of FIG. 1. In particular, the flow charts illustrate the creation of stiction spring elements between two or more objects. The flow charts may be performed in several cycles to produce stiction simulations. The operations 400 can be performed in a computer-based process that involves stages of defining, animating, simulating, and displaying various objects that make up a character, such as the character 100 shown in FIG. 1. This approach can provide a convenient and time-efficient character simulation.

The operations begin in step 402 with loading the animation module 302. The animation module 302 in this example includes an animation package (Zeno) that may be loaded with character geometry data, for example. In step 404, the Zeno package may create and manipulate character geometry or scene geometry. For example, three dimensional geometry of the character in FIG. 1 can be created and manipulated in the Zeno package. Other animation packages may be used instead of, or in addition to, the Zeno package.

Within the Zeno animation package, scene geometry 406 can be defined as a mesh object 408 or a poly surface object 410. The mesh object 408 is a data structure which contains the information necessary to define a three dimensional mesh. The poly surface object 410 is a data structure defining a set of polygons forming a three dimensional object. In general, the mesh and poly surface objects may be converted into a rigid body object. In particular, a new object identifier is created when the mesh or poly surface object is converted into a rigid body object.

After the geometry is created, simulation objects may be created from the geometry, in step 412. The simulation objects may be included as part of a solver object library 414. The solver library may be included as part of physics solver module 306 (FIG. 3), for example. The solver objects in this example may define variables 416 (e.g., C++ programming objects) identifying characteristics of the character's geometry. For example, the solver objects may identify details about a character's cloth mesh, rigid dynamics, collision rate, physics solver input, or stiction setup, to name a few examples.

Upon creating the simulation objects, the objects may be configured, in step 418. In general, various parameters may be configured for any or all simulation objects. For example, the user may set parameters to configure how stiction will be implemented for a particular geometry. The parameters may also be used to implement setup procedures, such as positioning simulation objects in a scene, setting solving parameters to control time stepping, setting attach and detach parameters for stiction, or making stiction springs visible in a particular geometry.

Once the simulation objects are created, the simulation can be processed by initiating a solver to run, in step 420. For example, the dynamics simulation library (SgDyn) 314 may create one or more internal solver objects 422 that may be used to process the simulation. The solver objects may represent rigid, cloth, or flesh simulation structures, to name a few examples. The solver may also have access to objects that can influence the velocities, forces, and final positions of the simulation structures. In some implementations, the simulation module 304 (FIG. 3) may cache the simulation results for playback to a user, for example.

After the simulation's internal objects are created, the solver may be initialized in step 424. For example, variables used in the stiction process, such as solver time, animation values, spring density, and area maps may be initialized. Further, library data can be retrieved for any or all characters or objects as part of the initialization process.

The operations 400 continue between the connection "A" at the bottom of FIG. 4A and the connection "A" at the top of FIG. 4B. Turning to the illustrated embodiment in FIG. 4B, the solver may begin solving frames for one or more rigid bodies. For example, advancing a rigid body in a frame may begin with a call to (e.g., invocation of) the solver. The call may include a start time and a target completion time. In general, the call can push scene parameters onto the rigid body and integrate the parameters into the frame accordingly.

As part of the solving of a frame, callbacks 428 may be provided by the physics solver module 306 (FIG. 3), for example. The callbacks 428 here include updating kinematic rigid states, updating rigid body parameters, and updating solids parameters. The callbacks 428 may be invoked in the process of solving a frame. In some implementations, the callbacks 428 may be invoked from internal solver classes, and implemented within the DynExample that will be described with reference to FIG. 5 below.

At the beginning of each time step during simulation, an update, shown at 430, may be applied to the stiction manager. As such, stiction spring elements may be reevaluated in each cycle. For example, cycling through the operations 400 may create an update for the stiction manager if user input has changed or if springs are created, destroyed, or modified. In some implementations, the spring element reevaluation may include selecting specific criteria during a subsequent cycle. For example, the stiction manager may select and assign a new spring element length for the next cycle. In some implementations, the new length may be the shortest length between (i) a predefined rest length and (ii) a current length of the spring element.

There will now be described an example of updating a stiction manager. The update may begin by initializing stiction parameters, such as source points, source objects, target points, target objects, and their respective spring element connections. For example, the state of the source object may be updated where new springs may be identified, old springs may be reevaluated, and invalid springs may be broken. Accordingly, previous stiction states for springs, connections, and spring forces may be cleared or reset.

An update to the stiction manager may occur upon creating one or more spring element. Spring elements may be created when predefined criterion for spring element creation is met. The spring element may be created between a source point and a target point. The stiction manager can be updated about the created spring. One example of criterion for spring element creation may be that a selected source object and target object are at less than a predefined distance. Another example criterion may indicate the absence of a spring between the source point and the target point. Yet another example criterion for spring creation may be the placement of a map parameter that permits the spring element to be created in the mapped region. In yet another example, a spring may be created when each of the source point and the target point have less than a predefined spring density.

An update to the stiction manager may also occur upon deletion or detachment of one or more spring elements. Spring elements may be detached according to predefined user input, such as the current length of the spring reaching a user defined maximum length. For example, simulation may cause an object to move over time where springs may be stretched to a user defined detachment point during the simulation. In some implementations, a specific compression of the spring element may indicate detachment of the spring. For example, the rest-length of the spring can be rebuilt in every cycle so that the spring tends to pull the source and target objects together.

An update to the stiction manager may also occur upon exceeding a predefined time limit for the spring element. For example, the character of FIG. 1 may be directed by a user to stretch one or more tentacles for a predefined amount of time before the spring element is detached and the tentacles recoil. In some implementations, a spring can exist for a predetermined (e.g., short) period of time. For example, this can be done by controlling the lifecycle of an individual spring. The update examples described above are not all inclusive. As such, other scenarios may invoke an update to the stiction manager.

After updating the stiction manager, the rigid body objects and the simulation objects may be advanced in time, shown at 432. First, the current state of the rigid body object may be stored and the modifications may be simulated as deformations of the object. Updates can be made, time can be advanced, and the new state of the rigid body object may be stored as new versions. The rigid body may be synchronized with the deformations of the object. Next, the deformable object properties, the deformable object state, and the collisions between objects may be updated in the stiction manager.

In step 434, the solver state may be retrieved. The solver state may be used to determine whether or not all frames have been solved, in step 436. If the available frames have not been solved, the system may solve the next frame available, in step 438. If the available frames have been solved, the process may end, in step 440.

Figure 5:
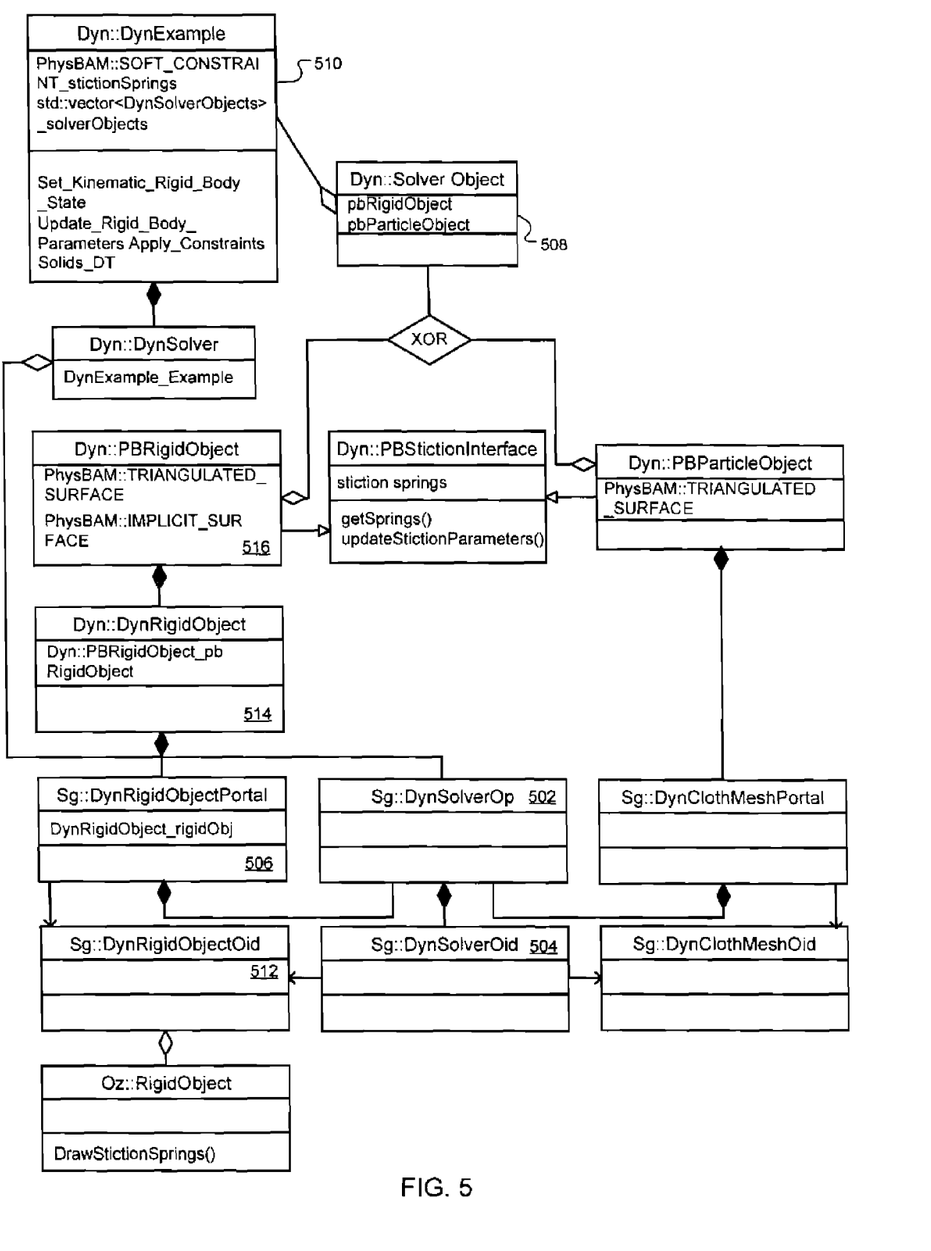
FIG. 5 is a class diagram illustrating a relationship between a dynamic simulation library and a simulation class library.

FIG. 5 is a class diagram illustrating a relationship between a dynamic simulation library, such as the library 314 (FIG. 3), and a simulation class library, such as the library 310. When the user initializes the solver, a Sg::DynSolverOp 502 may examine object identifiers associated with its Sg::DynSolverOid 504, and may create a Sg::DynRigidObjectPortal 506 for each object. When the Sg::DynRigidObjectPortal 506 is created, it can be assigned the object identifier that it is associated with. The constructor of the portal may then create a Dyn object, and its base class (Dyn::SolverObject 508) can be registered with the Dyn::Example 510.

The following example demonstrates how the rigid libraries can be related to one another. In general, the Sg::DynsolverOp 502 can create a Sg::DynRigidObjectPortal 506 (derived from Portal) for each Sg::DynRigidObjectOid 512 it is associated with. The Sg::DynRigidObjectPortal 506 may have knowledge of its associated Sg::DynRigidObjectOid 512, and can be responsible for creating and initializing a Dyn::DynRigidObject 514. The Dyn::DynRigidObject 514 may create a PBRigidObject 516 (derived form the PhysBAM:RIGID_BODY) that can be used by the Dyn::Example 510. At the beginning of each frame, the Sg::DynRigidObjectPortal 506 may set animation parameters on the Dyn::DynRigidObject 514. Similarly, at the end of each frame, the Sg::DynRigidObjectPortal 506 may place the simulation results into a cache of the Sg::DynRigidObjectOids 512.

Figure 6:
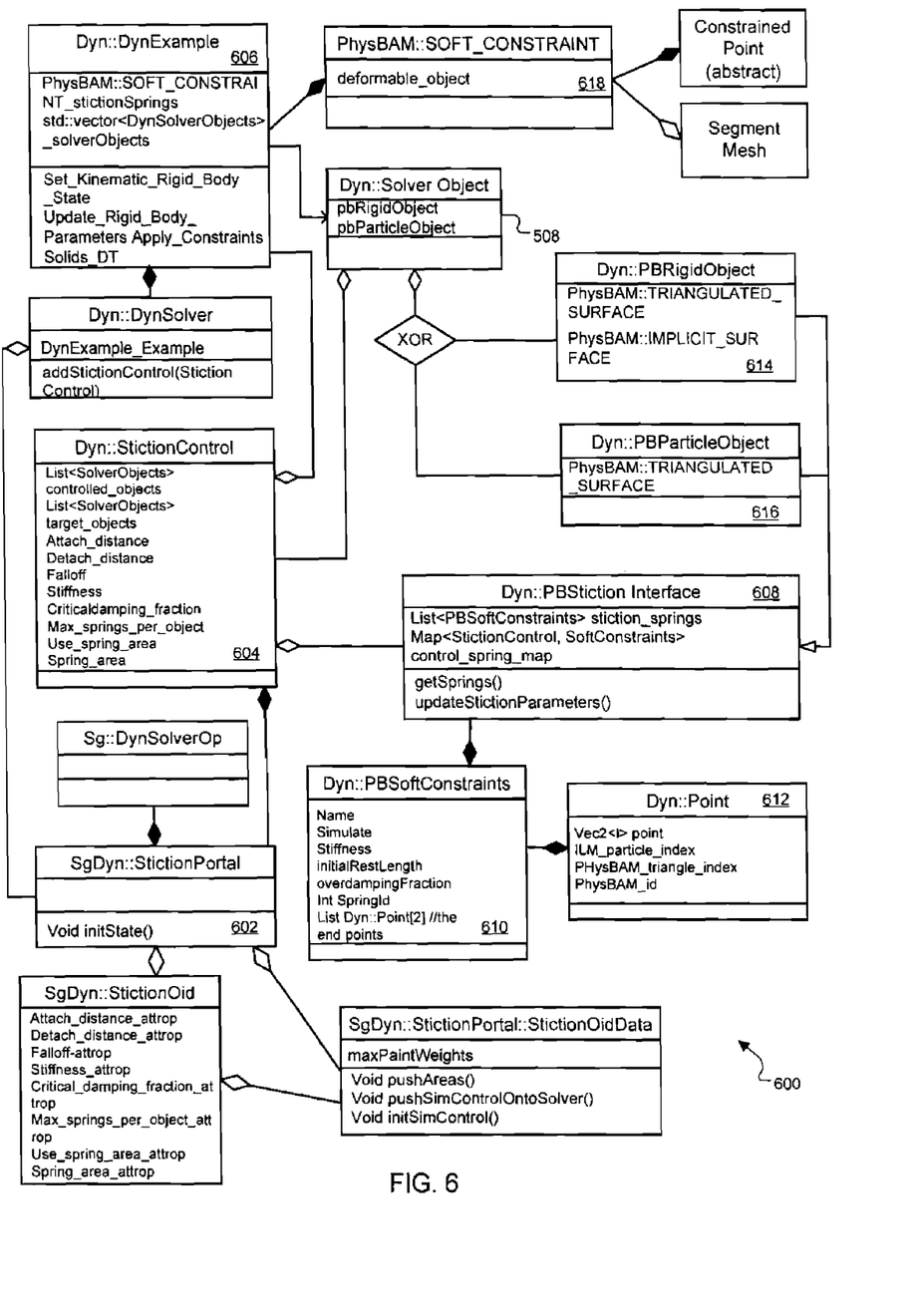
FIG. 6 is a class diagram illustrating a relationship between the dynamic simulation library and a stiction simulation class library.

FIG. 6 is a class diagram 600 illustrating a relationship between the dynamic simulation library and a stiction simulation class library. The class diagram 600 depicts an example that uses specific member variables and member functions to carry out creation of a stiction spring element. The class diagram 600 illustrates areas of responsibility for the internal objects of the physics solver 306 (FIG. 3). The following library objects will be discussed: A StictionPortal object 602, a StictionControl object 604, a DynExample object 606, a PBStictionInterface object 608, a PBSoftConstraint object 610, a DynPoint object 612, a PBRigidObject 614, a PBParticle object 616, and a PhysBAM SoftConstraint object 618.

The StictionPortal object 602 may provide communication between the SG data and the Dyn solver. The StictionPortal object 602 is here owned by the DynSolverOp 502, and may have knowledge of its associated StictionOid. The StictionPortal object may also initialize one or more painted areas for source and target objects.

The StictionControl object 604 can be owned by the StictionPortal object 602, and can be used by the DynExample 606 when the stiction manager is updated. The StictionControl object 604 may store general information for a set of stiction springs. For example, the object 604 may not store area maps that control individual spring properties, but it may hold global data, such as maximum spring length. The StictionManager can be configured to have no state, and can be recreated every time the Update_Stiction_Manager 430

(FIG. 4B) is invoked and can build a new list of springs each time. The StictionControl object 604 can maintain several global parameters, such as attach_distance, detach_distance, falloff, stiffness, critical damping_fraction, max_springs_per_object, use_spring_area, and spring$_{13}$ area, to name a few examples.

The DynExample object 606 may have a callback, such as DynExample::Update_Solids_Parameters (FIG. 4B) that may be invoked at the beginning of each frame. Upon invocation, the Update_Solids_Parameters can update the stiction manager. As such, the DynExample object 606 may be the part of the system that begins the update process. The object 606 can include a list of all solver objects. For example, this can mean that any solver objects that implement the PBStictionInterface are included in the stiction process (shown here with the PBParticleObject and PRRigidObject).

The PBStictionInterface object 608 may be defined for any or all simulation objects that use stiction springs. The object 608 may be a generic object that allows an udpateStictionManager( ) function to query information from the simulation object. For example, the PBStictionInterface object 608 includes a method that, given any point in space, can return the closest point on the surface of its object. For a rigid object, an algorithm can be implemented that relies on the existence of an implicit surface. A cloth object, in contrast, may not have an implicit surface, and a different implementation of the method may then be used. In some implementations, the PBStictionInterface object 608 may own the springs for its associated object, and the owned springs may be represented as a PBSoftConstraint for that object.

The PBSoftConstraint object 610 includes an individual spring object or a single stiction spring. This object 610 may store the properties for a single spring. For example, the StictionControl can store the stiffness for a group of springs, and when the actual stiffness of a spring is set in the updateStictionManager( ) function, it could actually be a result of painted area weights.

The DynPoint object 612 can represent an end point of a stiction spring. Locations of separate objects may be represented in different coordinate systems, for example such that a point on a surface of a rigid object is represented as a local space transformation from the center of mass of the rigid object. In contrast, a surface location of a cloth object can be stored as a barycentric location in a triangle on a mesh of the object. The DynPoint object 612 may allow a single class library to represent the end points of the spring, also when the end point is located on another object.

The PBRigidObject 614 and the PBParticle object 616 can represent simulation objects that may implement the PBStictionInterface 608 to enable use within the stiction framework. The PhysBAM SoftConstraint object 618 can be used by the physics solver to advance the springs in time. This object can contain one or more deformable objects used to define the stiction springs for the simulation.

Figure 7:
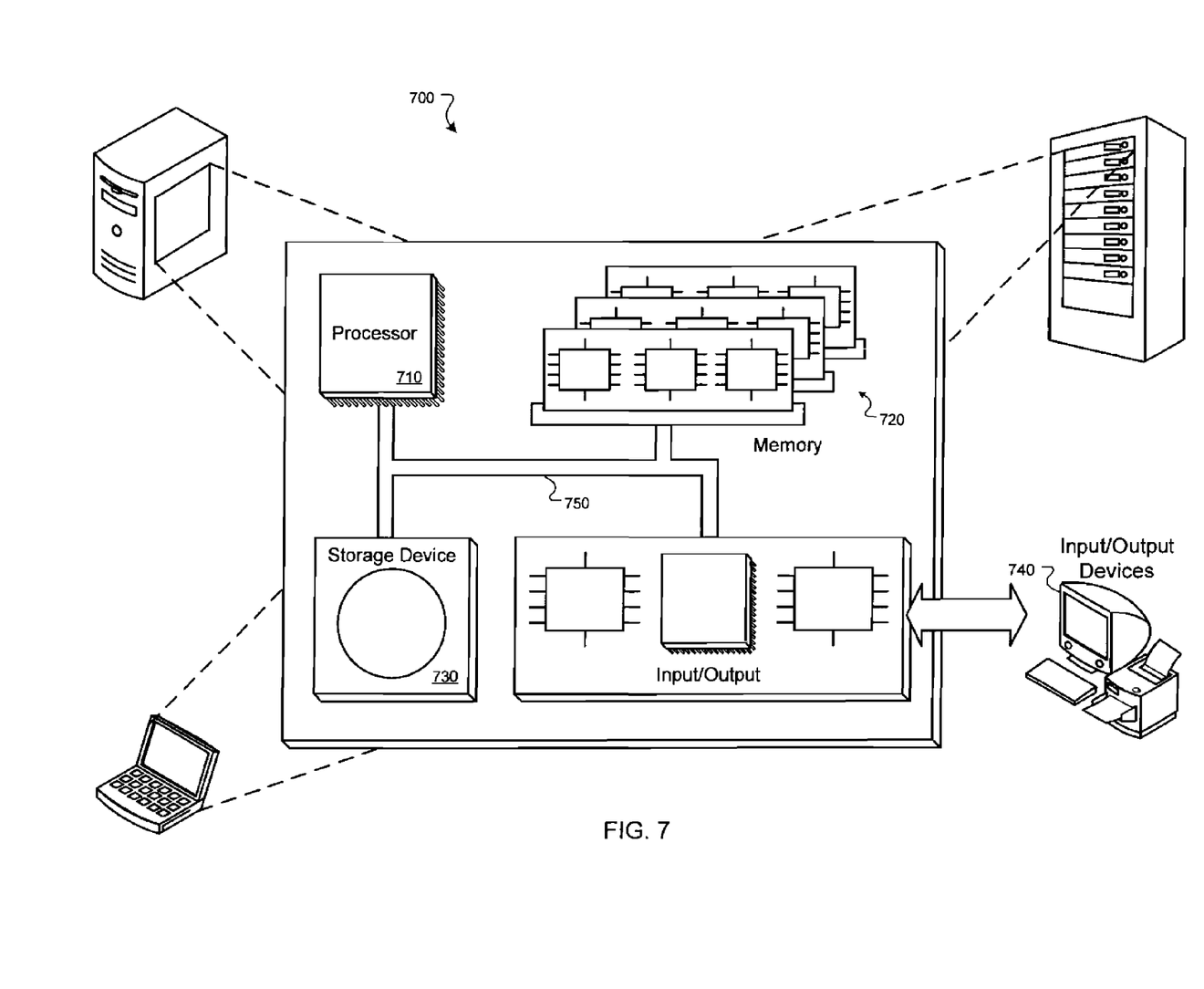
FIG. 7 is a block diagram of a computing system that can be used in connection with computer-implemented methods described in this document.

FIG. 7 is a schematic diagram of a generic computer system 700. The system 700 can be used for the operations described in association with any of the computer-implement methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for representing a connection between a source object and a target object in a simulation, the method comprising, for each of a plurality of time steps of the simulation:
    tracking, by a computer system, a distance between the source object and the target object, wherein the source object and the target object are both visible objects in a rendered scene;
    determining, by the computer system, that a distance between the source object and the target object at a first time is not within a first distance, wherein:
        a spring element between the source object and the target object does not exist at the first time; and
        the distance between the source object and the target object at the first time is within a second distance;
    determining, by the computer system, that a distance between the source object and the target object at a second time is within the first distance, the second time being after the first time;
    responsive at least to determining that the distance between the source object and the target object at the second time is within the first distance
        identifying, by the computer system, on the source object, a source point that is available for creating the connection to the target object;
        identifying, by the computer system, on the target object, a target point that is available for creating the connection to the source object; and
        creating, by the computer system, the spring element having respective ends at the source point and the target point determining, by the computer system, that a distance between the source object and the target object at a third time is within the second distance, the third time being after the second time, wherein:
            the spring element continues to exist at the third time; and
            the distance between the source object and the target object at the third time is not within the first distance;
    determining, by the computer system, that a distance between the source object and the target object at a fourth time is not within the second distance, the fourth time being after the third time;
    responsive at least to determining that the distance between the source object and the target object at the fourth time is not within the second distance, deleting, by the computer system, the spring element that forms the connection between the source object and the target object; and
    simulating forces applied to the source object as a result of the spring element being created and deleted during the simulation.

2. The method of claim 1, wherein one of the source object and the target object is the rigid object and another one of the source object and the target object is a deformable object.

3. The method of claim 1, wherein one of the source object and the target object is a non-dynamic object whose position is defined to not be affected by the simulation process.

4. The method of claim 1, further comprising evaluating another criterion for spring element creation selected from the group consisting of:
    no other spring element already having an end at either of the source point and the target point,
    a map parameter permits the spring element creation, and
    each of the source point and the target point having less than a predefined spring density.

5. The method of claim 1, wherein the target point is identified based on being a point on the target object closest to the source point.

6. The method of claim 1, wherein the simulation process is performed in cycles and wherein any existing spring elements are reevaluated in each cycle, the method further comprising:
    selecting, during a next cycle, a shorter length of:
        (i) a rest length of the spring element and
        (ii) a current length of the spring element; and
    assigning the shorter length as a new length of the spring element.

7. The method of claim 1, further comprising receiving, before creating the new spring element, a user-entered identification of at least one of several points on either of the source object and the target object to be eligible to be respectively either the source point or the target point.

8. The method of claim 7, further comprising presenting at least one of the source and target objects in a graphical user interface to a user before the simulation and receiving from the graphical user interface the user-entered identification of the at least one of several points.

9. The method of claim 1, further comprising receiving, before the simulation, a user-entered definition of at least one property of the spring element.

10. The method of claim 9, wherein the at least one property comprises a property selected from the group consisting of: the first distance for creating the spring element, the second distance for detaching the spring element, a threshold density of spring elements, a spring stiffness, a spring damping, a lifecycle of the spring element, and a spring rest length.

11. The method of claim 1, wherein the spring element is defined so that an attractive force between the source object and the target object is simulated.

12. The method of claim 1, wherein the spring element is defined so that a repulsive force between the source object and the target object is simulated.

13. The method of claim 1, wherein at least one of the source object and the target object is included in an articulated chain of objects wherein a torque function is defined between adjacent objects in the articulated chain.

14. The computer-implemented method recited in claim 1 further comprising, when the new spring element is attached between the source and target objects, maintaining the spring element in the simulation while the distance between the source object and target object is between the first and second distances.

15. A system comprising:
one or more processors;
one or more memory devices comprising instructions that, when executed by the one or more processors, cause the one or more processors to perform operations comprising:
tracking a distance between the source object and the target object, wherein the source object and the target object are both visible objects in a rendered scene;
determining that a distance between the source object and the target object at a first time is not within a first distance, wherein:
a spring element between the source object and the target object does not exist at the first time; and
the distance between the source object and the target object at the first time is within a second distance;
determining that a distance between the source object and the target object at a second time is within the first distance, the second time being after the first time;
responsive at least to determining that distance between the source object and the target object at the second time is within the first distance:
identifying, on the source object, a source point that is available for creating the connection to the target object;
identifying, on the target object, a target point that is available for creating the connection to the source object; and
creating the spring element having respective ends at the source point and the target point;
determining that a distance between the source object and the target object at a third time is within the second distance, the third time being after the second time, wherein:
the spring element continues to exist at the third time; and
the distance between the source object and the target object at the third time is not within the first distance;
determining that a distance between the source object and the target object at a fourth time is not within the second distance, the fourth time being after the third time;
responsive at least to determining that the distance between the source object and the target object at the fourth time is not within the second distance, deleting the spring element that forms the connection between the source object and the target object; and
simulating forces applied to the source object as a result of the spring element being created and deleted during the simulation.

16. The system of claim 15, further comprising a simulation module includes a dynamics simulation library that includes data abstractions for configuring the simulation process.

17. The system of claim 16, wherein the dynamics simulation library is configured to connect to a physics solver module that applies at least one force between the source and target objects.

18. The system of claim 16, wherein the dynamics simulation library includes a library of simulation classes for the simulation process.

19. The system of claim 18, wherein the dynamics simulation library includes objects that communicate with a physics solver module that applies at least one force between the source and target object.

20. The system recited in claim 15 wherein the simulation process performed by the simulation module further comprises, when the new spring element is attached between the source and target objects, maintaining the spring element in the simulation while the distance between the source object and target object is between the first and second distances.

21. A computer program product tangibly embodied in a nontransitory computer readable storage device, the computer program product including instructions that, when executed by one or more processors, cause the one or more processors to perform operations comprising:
tracking a distance between the source object and the target object, wherein the source object and the target object are both visible objects in a rendered scene;
determining that a distance between the source object and the target object at a first time is not within a first distance, wherein:
a spring element between the source object and the target object does not exist at the first time; and
the distance between the source object and the target object at the first time is within a second distance;
determining that a distance between the source object and the target object at a second time is within the first distance, the second time being after the first time;
responsive at least to determining that distance between the source object and the target object at the second time is within the first distance:
identifying, on the source object, a source point that is available for creating the connection to the target object;
identifying, on the target object, a target point that is available for creating the connection to the source object; and
creating the spring element having respective ends at the source point and the target point determining that a distance between the source object and the target object at a third time is within the second distance, the third time being after the second time, wherein:
the spring element continues to exist at the third time; and
the distance between the source object and the target object at the third time is not within the first distance;
determining that a distance between the source object and the target object at a fourth time is not within the second distance, the fourth time being after the third time;
responsive at least to determining that the distance between the source object and the target object at the fourth time is not within the second distance, deleting the spring element that forms the connection between the source object and the target object; and simulating forces applied to the source object as a result of the spring element being created and deleted during the simulation.

22. The computer program product recited in claim 21 wherein the instructions, when executed by the processor, perform a method that further comprises, when the new spring element is attached between the source and target objects, maintaining the spring element in the simulation while the distance between the source object and target object is between the first and second distances.

\* \* \* \* \*